US008196551B1

(12) United States Patent
Tsengas

(10) Patent No.: US 8,196,551 B1
(45) Date of Patent: Jun. 12, 2012

(54) MULTI SENSORY STIMULATION SIMULATED PREY PET TOY

(75) Inventor: Steven Tsengas, Fairport Harbor, OH (US)

(73) Assignee: OurPet's Co., Fairport Harbor, OH (US)

( * ) Notice: Subject to any disclaimer, the term of this patent is extended or adjusted under 35 U.S.C. 154(b) by 0 days.

(21) Appl. No.: 12/977,398

(22) Filed: Dec. 23, 2010

Related U.S. Application Data

(60) Provisional application No. 61/410,056, filed on Nov. 4, 2010.

(51) Int. Cl.
*A01K 29/00* (2006.01)
(52) U.S. Cl. ......... 119/707; 446/351
(58) Field of Classification Search ......... 119/702, 119/707; 446/297, 330, 351
See application file for complete search history.

(56) References Cited

U.S. PATENT DOCUMENTS

| 2,731,266 | A | * | 1/1956 | Neilson | 273/121 A |
| 4,194,737 | A | * | 3/1980 | Farmer | 473/570 |
| 4,256,307 | A | * | 3/1981 | Brooks | 273/118 A |
| 5,517,945 | A | * | 5/1996 | Udelle | 119/608 |
| 6,371,053 | B1 | | 4/2002 | Tsengas | |
| 2005/0009438 | A1 | * | 1/2005 | Chojnacki et al. | 446/120 |
| 2011/0014848 | A1 | * | 1/2011 | Law | 446/330 |

* cited by examiner

*Primary Examiner* — Rob Swiatek
*Assistant Examiner* — Lisa Tsang
(74) *Attorney, Agent, or Firm* — John D. Gugliotta, PE, Esq

(57) ABSTRACT

A simulated mouse toy having a prerecorded sound chip therein is provided which emits a prerecorded sound upon physical movement, such as when swatted, rolled or carried, to encourage pets to continue to play. A motion imparting device formed of a solenoid is operatively connected in conjunction the prerecorded sound chip to simultaneously provide a jittery or twitching visual stimulation.

11 Claims, 4 Drawing Sheets

MULTI SENSORY STIMULATION SIMULATED PREY PET TOY

RELATED APPLICATIONS

The present invention claims the benefit of U.S. Provisional Application 61/410,056 filed on Nov. 4, 2010.

BACKGROUND OF THE INVENTION

1. Field of the Invention

The present invention relates generally to a pet toy simulating the natural prey of a target pet and, more specifically, to an improved mouse-like pet toy comprising a motion assembly that imparts a twitching or similar jittery movement that stimulate a greater interaction by cats.

2. Description of the Related Art

Many different devices have been developed to assist pet owners in keeping their pets happy and healthy. Such devices can be seen in numerous pet stores and catalogs. Different types of balls, bones and other such toys can be purchased by the owner to be used by their pets for exercise and enjoyment. However, pets tend to having limited interest in stagnant devices due to lack of visual stimulation and thus, the pets do not benefit from exercise and enjoyment from such devices when they are not used by the pets.

Domestic cats make roving searches of their indoor environments in search of prey. There are many toys known in the art to encourage this natural, instinctive behavior. Other toys aim to also stimulate a cat's pouncing abilities as a form of playful interaction between the cat and a toy. However, domestic cats are specialized hunters whose techniques require crypticity for success. Most domestic animals depend on both acoustic and visual cues to hunt prey; however, an importance of acoustic cues is especially emphasized for cats because they possess better acoustic discrimination abilities than dogs. Cats respond physiologically to higher-pitched sounds; scratches, noises and high-pitched mouse calls act upon an innate releasing mechanism which directs a cat's attention to a source of the sound. It isn't until after the cat's attention is gained when a moving source can elicit any pouncing movement by the cat.

Because mice and birds are common prey hunted by cats, many of these toys take a form that resembles one of these natural preys. U.S. Pat. No. 6,371,053, to the present inventor, is such a toy, wherein a simulated, cloth mouse comprises a sound chip that emits a prerecorded sound in response to its engagement. Similar toys exist to resemble birds.

The present invention is a pet toy that comprises a means to replicate the vocalizations studied in mice, in addition to a naturally appearing motion as the bases for the toy claimed herein.

A search of the prior art did not disclose any patents that read directly on the claims of the instant invention; however, of considerable relevance is U.S. Pat. No. 6,371,053, issued on Apr. 16, 2002 to the present inventor. While a to sound simulated mouse toy having a prerecorded sound chip therein is incorporated into this invention in combination, other elements are different enough as to make the combination distinguished over the inventors' own prior art.

Consequently, a need has been felt for providing an apparatus and method of providing both visual and sound stimulation to attract the interest of nocturnal pets.

SUMMARY OF THE INVENTION

It is an object of the present invention to provide an improved sensory simulating toy for pets.

It is a feature of the present invention to provide such a pet toy having both a prerecorded sound chip and a motion assembly that imparts a twitching or similar jittery movement that are both actuated by imparting motion to the toy.

Briefly described according to one embodiment of the present invention, a simulated mouse toy having a prerecorded sound chip therein is provided in accordance with the present invention emits a prerecorded sound upon physical movement, such as when swatted, rolled or carried, to encourage pets to continue to play. A motion imparting solenoid is operatively connected in conjunction the prerecorded sound chip. A controlled operating signal, such as a syncopated or wave operating signal, a delay, or similar configured signal, actuates the solenoid in a controlled manner to simultaneously or subsequently provide a twitching or jittery motion to the toy, thereby adding visual stimulation.

An advantage of the present invention is that it provides a visual stimulation that is consistent with the pet's instinctual responses, and thereby encourages pets to interact and obtain the benefit of exercise and enjoyment from playing with the toy.

Another advantage of the present invention is that it provides auditory and visual stimulation simultaneously.

Further, the structural assembly forming the motion imparting solenoid of the present invention can be made very inexpensively and can be operated effectively with very lower power consumption, thereby making such a device economically effective for use in relatively low cost applications such as pet toys.

These and other objects of the present invention are attained by various embodiments incorporating the teachings of the present invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1-5.

1. Detailed Description of the Figures

Referring now to FIGS. 1-6, a simulated prey toy having a prerecorded sound chip is provided as generally described in U.S. Pat. No. 6,371,053, issued on Apr. 16, 2002 to the present inventor, and incorporated by reference herein as if fully rewritten. The simulated prey toy emits a prerecorded sound upon physical movement, such as when swatted, rolled or carried, to encourage pets to continue to play. A motion imparting solenoid is operatively connected in conjunction the prerecorded sound chip, as described in greater detail below.

Figure 1:
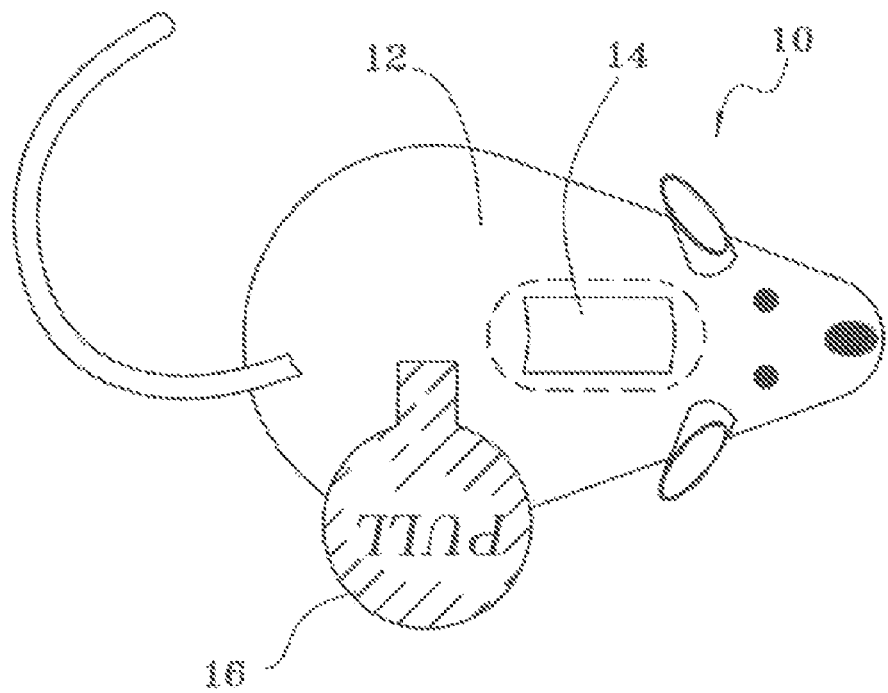
FIG. 1 is top view of a simulated prey toy having a multi sensory stimulation device targeted toward a pet's instincts and behaviors in accordance with a preferred embodiment of the present invention.
Figure 2:
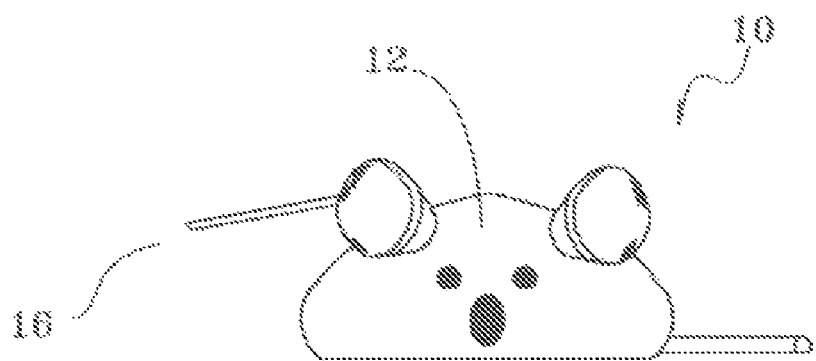
FIG. 2 is a front view of the preferred embodiment of the present invention shown in FIG. 1.
Figure 3:
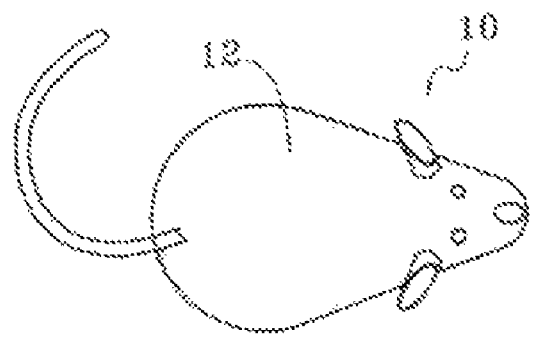
FIG. 3 is an exploded top view of the present invention shown in FIG. 1 with the sound chip assembly removed from the simulated mouse toy.
Figure 3:
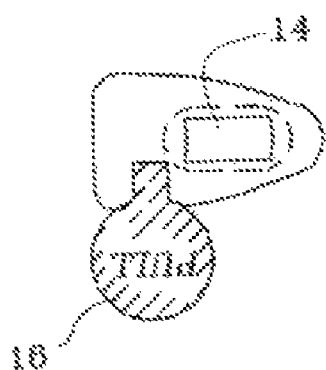
Figure 4:
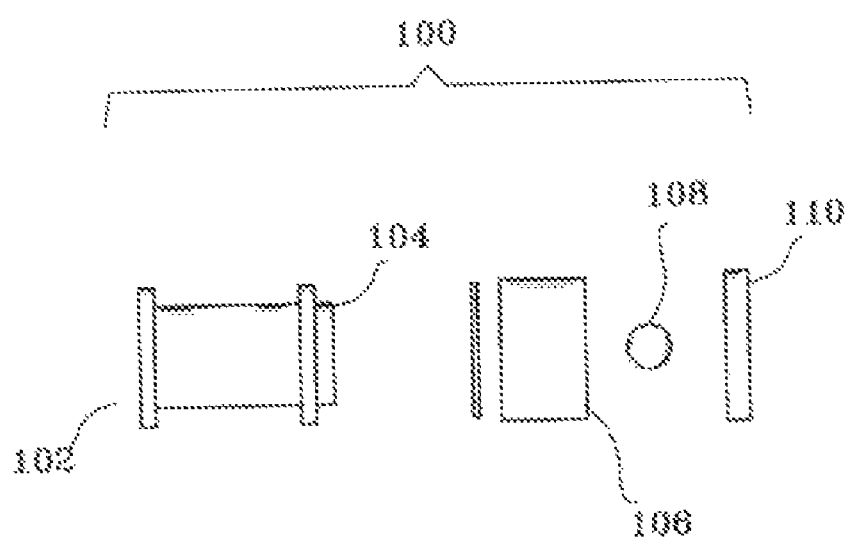
FIG. 4 is an exploded perspective view of a motion imparting solenoid 100 for use in accordance with the preferred embodiment.

FIGS. 1 through 3 illustrate a top view, a front view, and an exploded top view, respectively, of a multi sensory stimulation simulated mouse toy, identified generally as 10, is shown having a multi sensory stimulation device targeted toward a pet's instincts and behaviors in accordance with the preferred embodiment of the present invention. Simulated mouse toy 10 generally includes outer cover 12 having an internal cavity and multi sensory stimulation chip assembly 14 is positioned in the interior cavity of outer cover 12. Outer cover 12 is most preferably fabricated from a relatively soft, yet durable, textile material with filling or stuffing and has the outward appearance of a mouse. Multi sensory stimulation chip assembly 14 includes a shaker barrel activator, a prerecorded sound chip, a motion imparting solenoid and a source of electrical power, such as a battery. If desired, catnip can be placed in the interior cavity of outer cover 12 and the catnip, along with the outward appearance of outer cover 12, will attract pets, such as, for example, cats.

A multi sensory stimulation device 10 is housed within the assembly 14 preferably emits a prerecorded sound in response to a movement of multi sensory stimulation device 10. The motion imparting solenoid 100 is best shown in conjunction with FIG. 4 in which an exploded view of the solenoid 100 is shown having a generally cylindrical solenoid body 102 provided as a tubular plastic body forming a drive magnet cavity 104 within and supporting a coil body 106. A spherical neodymium magnet 108 is retained within the cavity 104 by solenoid cap 110. The coil body 106 is formed of copper magnet wire, herein shown as a coil of 30 AWG copper wire and in electrical and operative communication with the operational circuitry and battery of the device (not shown).

Thus, when a pet, such as a cat, swats simulated mouse toy 10, a prerecorded sound is activated and/or the housing can be shaken or vibrated with an irregularly appearing 'twitching' mannerism. The prerecorded sound can be a "permanent" prerecorded sound such as an animal's voice, such as "meow" or "purrrrrr," a beeping sound, a human voice, laughter, such as "ha, ha, ha" or some other desired sound, or can be recorded, and prerecorded, as desired, by the user. The prerecorded sound and/or imparted twitching motion may continue for a predetermined time period, for example five (5) seconds, and then stop until simulated mouse toy 10 is again moved. Pull tab 16 is preferably inserted into multi sensory stimulation device 14 to preclude sound multi sensory stimulation device 14 from emitting sound prior to pull tab 16 being removed from multi sensory stimulation device 14.

Figure 5:
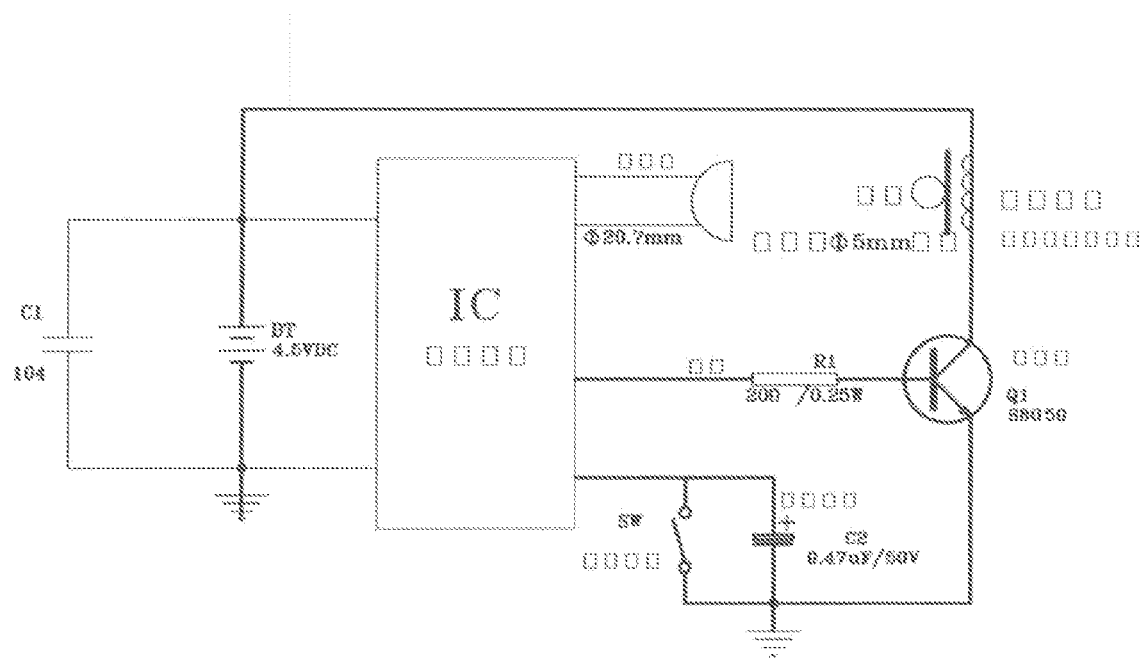
FIG. 5 is a typical electrical schematic for exemplary operation of the multi sensory stimulation device for use herein.

Referring next, to FIG. 5, a typical electrical schematic for exemplary operation of the multi sensory stimulation device is shown for purposes of disclosing a best mode as currently known. It would be obvious to a person having ordinary skill in the relevant art that many modifications or alternates to the typical electrical schematic would be operationally equivalent within the teachings, features and benefits of the current invention.

Figure 6:
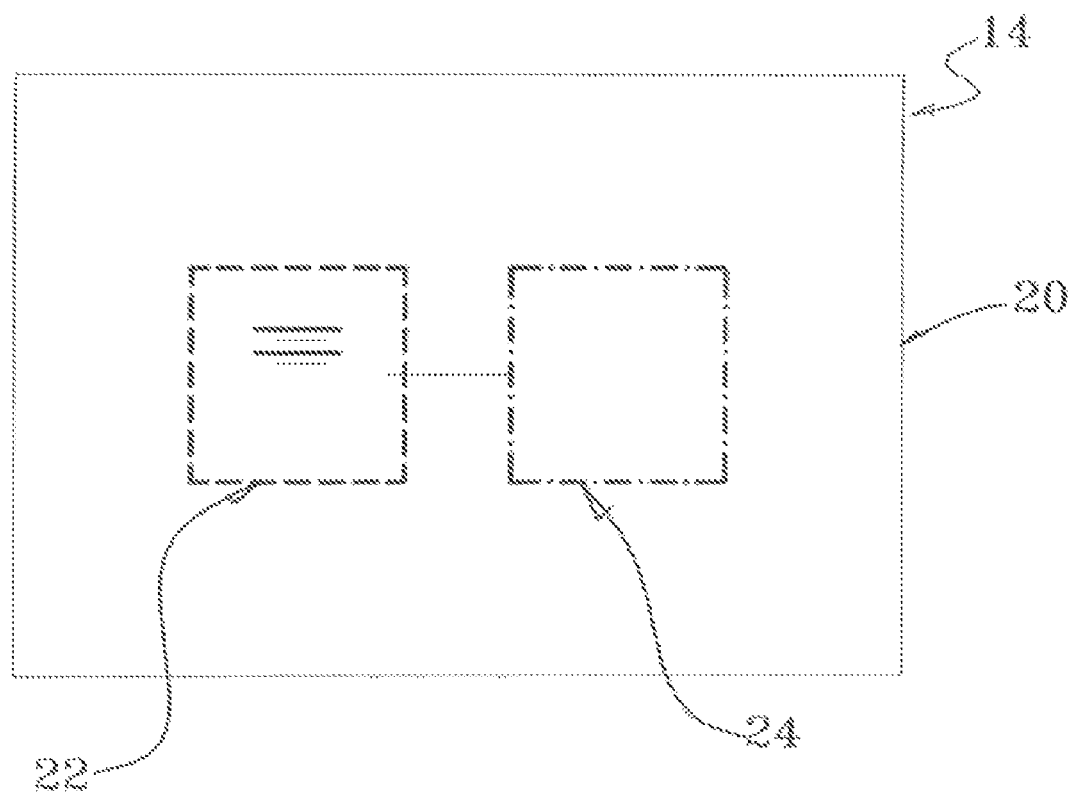
FIG. 6 is a schematic view of the prerecorded chip assembly with a housing, sound chip, and power source.

Referring next, to FIG. 6, the chip assembly 14 is shown containing a housing 20, a power source 22, and a prerecorded sound chip 24. The housing 10 can be made of any suitable material, however it is anticipated that it will be made of plastic. The power source 22 is a conventional known method such as a battery. The prerecorded sound chip 24 can have a variety of sounds emitted, yet according the preferred embodiment the sound emitted will be similar to that of an actual live mouse.

2. Operation of the Preferred Embodiment

In operation, when a user imparts motion or continued to move the simulated mouse toy having a multi sensory stimulation device targeted toward a pet's instincts and behaviors. Sufficient physical motion activates the prerecorded sound chip and motion mechanism. As power is imparted to the coil body 106 the magnet 108 is jerked or moved from its prior resting position. The corresponding shift of mass will impart a slight, but perceptible motion to the toy housing that can be made to appear as a naturally occurring reflex of a target prey such as a rodent. A syncopated or wave operating signal can actuate the solenoid to provide a longer, more continuous looking motion having the appearance of a twitching or jittery motion in the toy. This motions adds visual stimulation to the target pet, and specifically felines.

The present configuration is intended to show the application of imparting an low cost but effective motion to the pet toy for the intended application. It is anticipated that variations or tuning of the motion can be made through modification or adaptation of the functional features of the solenoid. By way of example, and not as a limitation, the use of a compound geometry with the cavity 104 retaining the magnet 108 may be used to create changes in directionality or shifts in momentum when the solenoid is actuated.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A toy comprising:
    a housing;
    a prerecorded sound chip assembly contained within said housing, said sound chip assembly having a sound chip and a source of electrical power, said sound chip assembly is positioned in said housing and said sound chip assembly emits a prerecorded sound in response to physical urging;
    a motion imparting device operatively connected in conjunction with the prerecorded sound chip to simultaneously provide a twitching or jittery motion for visual stimulation, wherein said motion imparting device comprises a solenoid.

2. The toy of claim 1, wherein said twitching or jittery motion is imparted in a time delayed fashion subsequent to the actuation of the prerecorded sound.

3. The toy of claim 1, wherein said solenoid comprises:
    a generally cylindrical solenoid body provided as a tubular plastic body forming a drive magnet cavity;
    a spherical neodymium magnet retained within the cavity; and a coil body supported about said solenoid body, said coil body formed of copper magnet wire in electrical and operative communication with the operational circuitry and battery of said toy.

4. The toy of claim 1, wherein said housing resembles a prey animal of a cat or dog.

5. The toy of claim 4, wherein said prerecorded sound chip emits a sound resembling that of said prey animal.

6. A toy comprising:
   a housing;
   a prerecorded sound chip assembly contained within said housing, said sound chip assembly having a sound chip and a source of electrical power, said sound chip assembly is positioned in said housing and said sound chip assembly emits a prerecorded sound in response to physical urging;
   a generally cylindrical solenoid body provided as a tubular plastic body forming a drive magnet cavity;
   a spherical neodymium magnet retained within the cavity; and
   a coil body supported about said solenoid body, said coil body formed of copper magnet wire in electrical and operative communication with the operational circuitry and battery of said toy.

7. The toy of claim 6, wherein said prerecorded sound chip emits a sound resembling that of said prey animal.

8. In a pet toy having toy a housing and a prerecorded sound chip assembly contained within the housing, a sound chip for emitting a prerecorded sound in response to physical urging and a source of electrical power, wherein the improvement comprises:
   a motion imparting device contained within said housing and operatively connected in conjunction the prerecorded sound chip to simultaneously provide a jittery or twitching visual stimulation, wherein said motion imparting device comprises a solenoid.

9. The improvement of claim 8, wherein said housing resembles a prey animal of a cat or dog.

10. The improvement of claim 9 wherein said prerecorded sound chip emits a sound resembling that of said prey animal.

11. The improvement of claim 8, wherein said solenoid comprises:
    a generally cylindrical solenoid body provided as a tubular plastic body forming a drive magnet cavity;
    a spherical neodymium magnet retained within the cavity; and
    a coil body supported about said solenoid body, said coil body formed of copper magnet wire in electrical and operative communication with the operational circuitry and battery of said toy.

* * * * *